March 13, 1951 J. J. WRENN 2,545,403
LIFTING JACK MECHANISM
Filed May 11, 1948 4 Sheets-Sheet 1
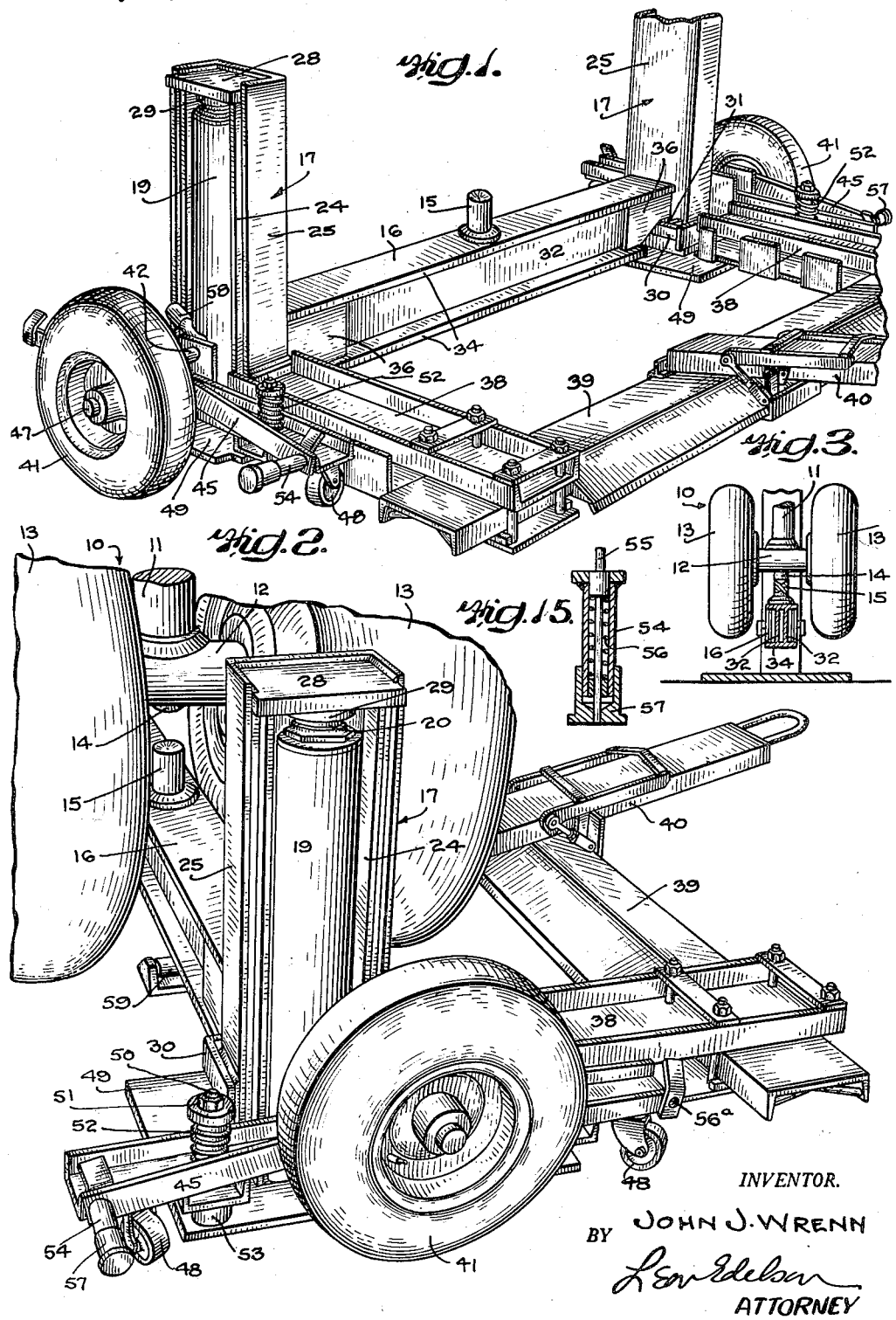
INVENTOR.
BY JOHN J. WRENN
ATTORNEY

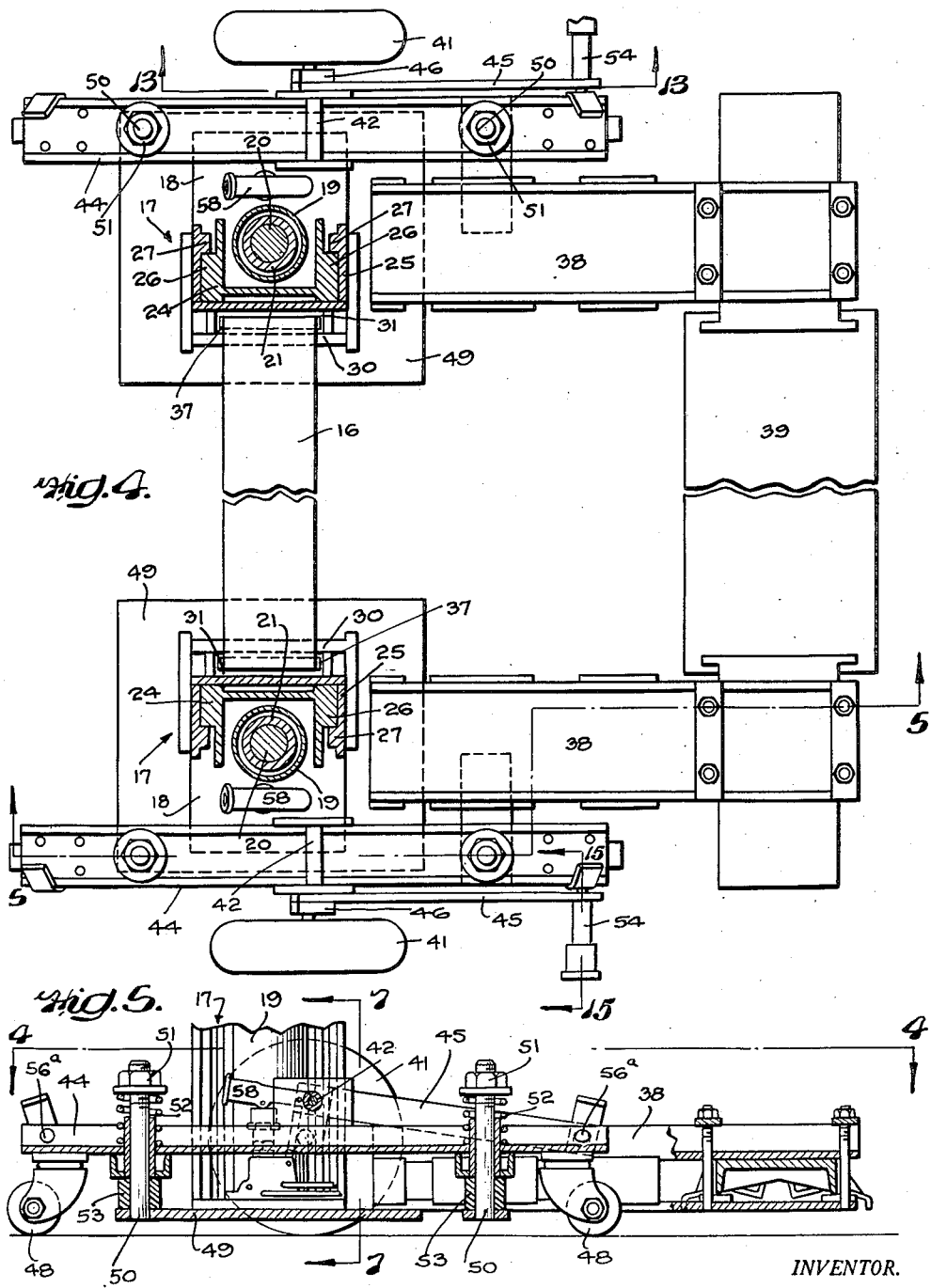

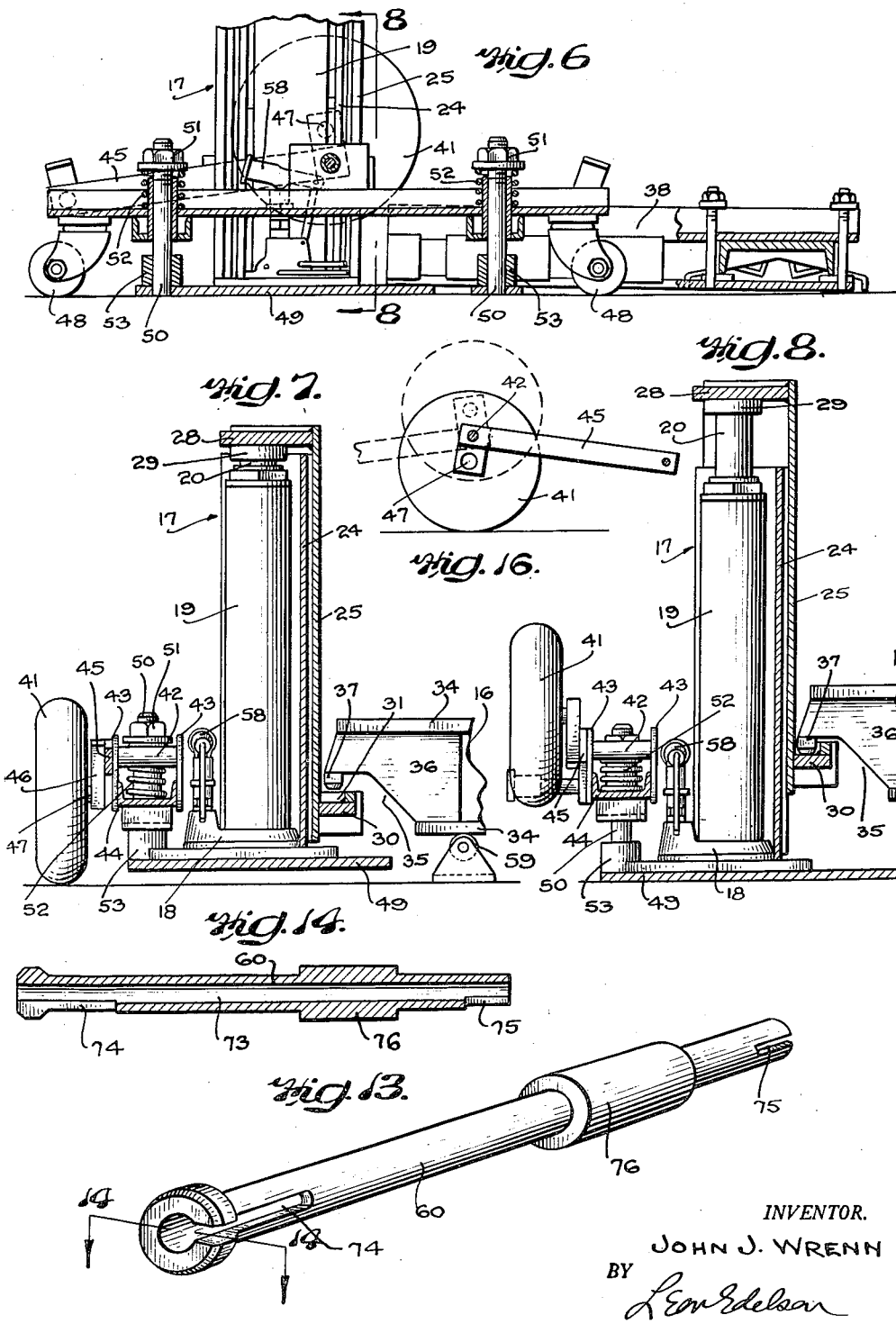

March 13, 1951          J. J. WRENN          2,545,403
LIFTING JACK MECHANISM
Filed May 11, 1948          4 Sheets-Sheet 4
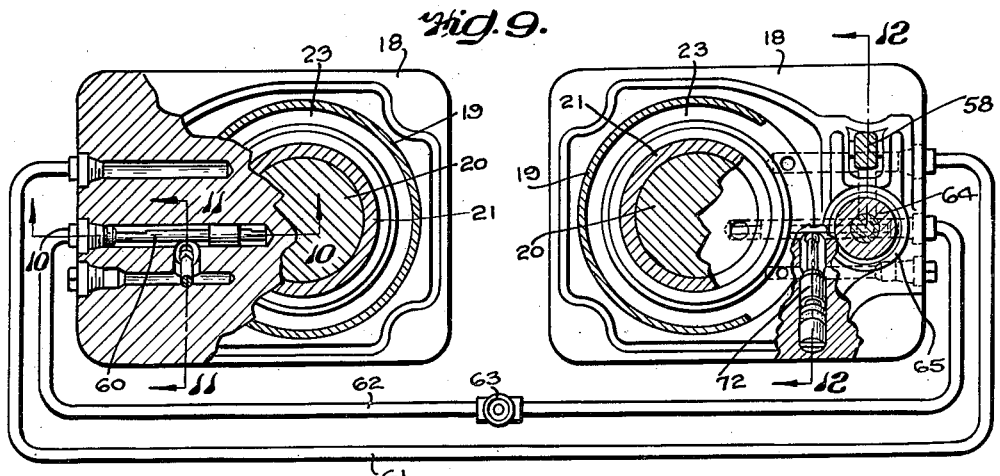
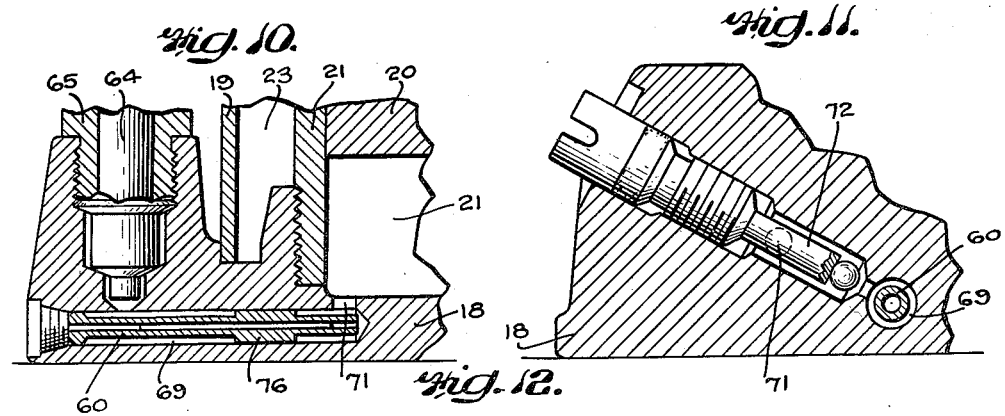
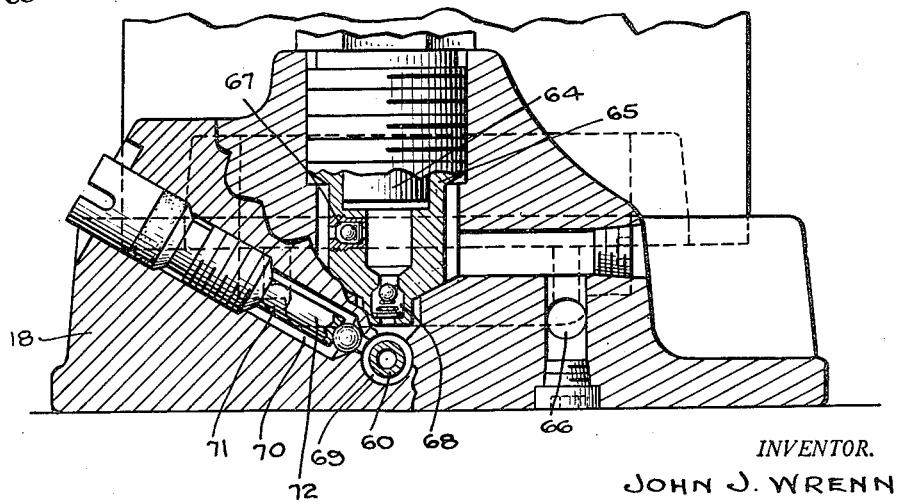
INVENTOR.
JOHN J. WRENN
BY
*L. Edelson*
ATTORNEY Patented Mar. 13, 1951

2,545,403

UNITED STATES PATENT OFFICE 2,545,403

LIFTING JACK MECHANISM

John J. Wrenn, Philadelphia, Pa.

Application May 11, 1948, Serial No. 26,394

11 Claims. (Cl. 254—2)

This invention relates to lifting jack mechanisms and more particularly to an improved construction of such mechanism especially adapted for use in the lifting of heavy aircraft equipped with single or dual wheels on each landing gear, this application being a continuation in part of my pending application, Serial No. 701,984, filed October 8, 1946, and now abandoned.

As was set forth in my original application above referred to, it is among the principal objects of the present invention to provide a lifting jack mechanism of sufficient capacity and stability to handle the main landing gears of large aircraft such as are now in service and such as are scheduled for operation in the near future, the mechanism being adapted for use to service airplanes with either single or dual tired landing gears, regardless of whether the aircraft is stationed in the hangar, on the apron or on the field.

The lifting of aircraft having dual tired landing gears, particularly when one or both of the tires of the dual wheel are flat, is especially troublesome due to the difficulty encountered in placing a jack mechanism in proper position relatively to the landing gear with the lifting element of the jack suitably disposed beneath the jack pad of the landing gear strut. The mechanism of the present invention is of such design as to facilitate proper placement of a jack mechanism beneath an aircraft landing gear even when the tires of both of its dual wheels are flat, and to enable a maintenance crew to raise with safety and minimum effort the heaviest aircraft now in service.

In its essential respects the mechanism of the present invention comprises a pair of heavy duty hydraulic jack units, each of which is bolted to a base plate and enclosed within a rigidifying channel member upon which latter is telescopically fitted a second channel member designed to support and raise one end of an especially designed jack beam. The pair of hydraulic jack units of the character just mentioned are respectively disposed to either side of the landing gear wheel axis for support therebetween of a horizontally disposed jack beam having a centrally located adapter element designed to engage the jack pad of the landing gear strut of the aircraft to be raised.

The telescopically associated channel members which embrace each of the hydraulic jack cylinders are respectively provided with coacting means which insure against lateral displacement of these channel members with respect to each other while permitting free vertical movement of the outer channel relatively to the inner channel, the arrangement being such that the load-supporting outer channel is constrained to move along a rectilinear line paralleling the vertical axis of the load-raising piston of the hydraulic jack. Each pair of the hydraulic jack cylinders which operate as component members of the jack mechanism are hydraulically so interconnected as to permit the same to be operated individually or in unison, the hydraulic system being such that when the jack cylinders are interconnected for operation in unison both jacks are simultaneously raised upon operation of either one or both of the hand operated pumps operatively associated with the jack cylinders.

An especial object of the present invention is to provide a jack mechanism having the operating characteristics hereinbefore mentioned and having provision for utilization of any one of several interchangeable jack beams, each of which latter is especially designed to provide proper length and lifting capacity to service the aircraft for which it is particularly designed. A still further object of the present invention is to provide a jack mechanism of the character described wherein the two beam-connected units of the jack mechanism are each spring mounted on caster-supported base plates which are normally free of the supporting ground and are pressed into firm engagement therewith only under the load of the aircraft raised by the jack mechanism, these base plates being suitably supported upon a structure having retractable transportation wheels to permit the mechanism to be readily towed from one position to another, these transportation wheels being shiftable into retracted position prior to placement of the jack operatively beneath the landing gear to be raised.

Other specific and important objects and advantages of the invention will appear more fully hereinafter, it being understood that the present invention consists in the combination, construction, location and relative arrangement of parts, all as will appear in detail in the following description, as shown in the accompanying drawings and as finally pointed out in the appended claims. In the drawings which are illustrative of a preferred construction of jack mechanism embodying the principles of the present invention, Figure 1 is a perspective view showing the assembled dual jack mechanism in condition to be moved about a landing field, the retractable transportation wheels being shown in position to support the jack mechanism for such transportation;

Figure 2 is a perspective view showing the mechanism of Figure 1 placed in position beneath a landing gear of an airplane to be lifted, the jack beam being shown disposed between the dual wheels of the landing gear, the transportation wheels being shown in their retracted position;

Figure 3 is a view in small scale showing the landing gear with its dual wheels raised above the ground;

Figure 4 is a plan view of the jack mechanism with certain portions of the hydraulic jack units thereof shown in horizontal section;

Figure 5 is a vertical sectional view of the mechanism as taken on the line 5—5 of Figure 4;

Figure 6 is a view similar to Figure 5, but showing the transportation wheels of the mechanism shifted into their retracted position while the base of the jack cylinder is firmly pressed against the ground under the load of the aircraft raised by the jack mechanism;

Figure 7 is a view, partially in section, as taken along the line 7—7 of Figure 5;

Figure 8 is a view, partially in section, as taken along the line 8—8 of Figure 6;

Figure 9 is a view in horizontal section of the two hydraulic jack units forming component parts of the jack mechanism showing the same hydraulically connected in accordance with the present invention, the horizontal sections of the hydraulic jack units shown in this figure being taken at respectively different elevations;

Figure 10 is a vertical sectional view of one of the hydraulic units as taken on the line 10—10 of Figure 9;

Figure 11 is a vertical sectional view as taken on the line 11—11 of Figure 9;

Figure 12 is a vertical sectional view as taken on the line 12—12 of Figure 9;

Figure 13 is a perspective view of a metering valve element employed in each of the hydraulic jack units for insuring equalization of hydraulic pressures therebetween and so provide for proper operation of the hydraulic units in unison;

Figure 14 is a horizontal longitudinal sectional view of the metering valve unit as viewed along the line 14—14 of Figure 13;

Figure 15 is a sectional detailed view as taken on the line 15—15 of Figure 4; and Figure 16 is a view of the retractable transportation wheel mounting as taken on the line 13—13 of Figure 4.

Referring now to the drawings and more particularly to Figures 1, 2 and 3 thereof, it will be observed that the jack mechanism of the present invention is of a design and construction which particularly adapts it for the raising and lowering of an aircraft landing gear such as that designated generally by the reference numeral 10, this gear being of the more or less conventional type having a vertical strut 11, a transversely extending wheel spindle 12 and a pair of landing wheels 13—13 respectively mounted on opposite ends of the spindle. For jacking purposes the spindle 12 is fitted on its bottom approximately midway between the dual landing wheels 13 with a jack pad 14 which is adapted to center on and be engaged by a suitably cupped adapter element 15 suitably fitted in the top center of a horizontally extending jack beam 16, this latter beam constituting the load-supporting beam of the jack mechanism and being supported at each of its opposite ends by a vertically movable saddle forming a component part of a hydraulically operated lifting jack unit designated generally by the reference numeral 17.

These lifting jack units 17 which support therebetween the main jack beam 16 are respectively disposed to either side of the landing gear spindle 12, and insofar as these hydraulic jack units are of identical construction, only one of them will be now described in detail.

As appears most clearly in Figures 1, 2, 4, 7 and 8, each of these hydraulic jack units 17 includes a suitably ported base 18 from which vertically extends a hydraulic cylinder 19 having a vertically movable load-supporting piston 20 (see Figure 9), this piston being operable within a high pressure cylinder 21 provided internally of the main outer cylinder 19. The annular space 23 formed between the concentric walls of the internal cylinder 21 and the external cylinder 19 of the jack unit constitutes an oil reservoir from which the necessary fluid under pressure is delivered to the piston 20 for raising the latter under load and to which it is returned upon lowering of the jack mechanism.

Rigidly secured to the base 18 of each of the hydraulic jack units 17, as by welding, is a channel member 24 with which is telescopically associated an outer vertically shiftable channel member 25. The mouths of these channels both present in the same direction, the nested channels being respectively provided with vertically extending interlocks 26 and 27 between each pair of their proximate side walls to prevent lateral displacement of the outer channel 25 relatively to the inner channel 24 while permitting the former to freely shift vertically with respect to the latter. The upper end of the outer channel 25 is closed by a horizontally disposed plate 28 suitably welded to the channel so as to form in effect an integral element thereof, this plate being adapted to rest upon the upper pad 29 of the jack load-supporting piston 20. It will be apparent from the foregoing that as the main piston 20 of the jack is raised it will carry with it the channel 25, the latter being guided for rectilinear vertical movement by the fixed channel 24 with which it is telescopically engaged.

Secured to the lower end of the vertically extending base wall of the outer channel 25 is a horizontally disposed saddle 30 having an upwardly presenting pocket 31 of generally rectangular shape, this pocket being adapted for removable accommodation of one end of the main load-supporting beam 16. As most clearly appears in Figures 7 and 8, this main load-supporting beam 16 is in the form generally of an I-beam having a pair of vertically disposed parallel webs 32—32 (see Figure 3) extending the full length thereof, the upper and lower edges of these webs being welded or otherwise integrally united to the horizontally disposed flat top and bottom members 34—34 of the beam. The opposite ends of the beam are each cut away as at 35 (see Figures 7 and 8), the end portions of the beam being additionally reinforced by vertical plates 36—36 extending across and secured to the cutaway portions of the vertical plate members of the beam. At either end thereof is a transversely extending bar 37 which more or less closely fits into the rectangular pocket 31 of the hydraulic jack cylinder saddle 30 above referred to.

Extending forwardly from the base 18 of each of the hydraulic jack units 17 is a supporting structure 38 for a connecting ramp 39, the opposite ends of this ramp being adjustably secured to the parallel structures 38—38 of the mechanism (see Figures 1 and 2) to lock the hydraulic jack units thereof together in such spaced relation as to properly accommodate therebetween the main load-supporting beam 16 of a desired length and load-carrying capacity. The ramp 39 is preferably of inverted V-shape in transverse section and of such shallow depth as to provide a surface over which a dolly or the like may be readily moved into position adjacent a wheel of the landing gear for supporting such wheel upon its removal from its raised landing gear. Preferably, the ramp 39 is fitted with a quick-detachable towing hitch 40 by means of which the jack mechanism may be drawn as by a tractor, from one position to another about the landing field or in the hangar.

Suitably mounted to either side of each of the jack units 17—17 is a retractable support or bearing for a transportation wheel 41. As most clearly appears in Figures 7, 8 and 16, this mounting for each of these transportation wheels 41 essentially includes a shaft 42 suitably journalled between the side walls 43—43 of a longitudinally extending channel-shaped rail 44. Suitably keyed to the outer end of this shaft is a shifting arm 45 fitted with a block 46, the latter serving as a bearing for the stub shaft 47 of the transportation wheel 41, this stub shaft 47 being thus eccentric with respect to the pivot shaft 42 of the shifting arm 45. Secured to opposite ends of each of the rails 44 are a pair of caster wheels 48—48, which serve to support the unloaded jack mechanism when the transportation wheels 41—41 thereof are shifted into their retracted positions.

When the shifting arm 45 is in its position as shown in Figures 1, 4, 5 and 7, the journal block 46 extends downwardly below the axis of the shaft 42 and so presents the transportation wheel 41 in position to engage the ground and support the mechanism for transportation to and from the aircraft to be serviced. When, however, the shifting arm 45 is swung into its opposite position, as shown in Figures 2 and 6, the journal block 46 is shifted upwardly above the axis of the shaft 42 and so raises the transportation wheel 41 above the ground to thereby permit the jack mechanism to be supported solely by the caster wheels 48—48 in direct engagement with the ground surface. In accordance with preferred operating procedure, the transportation wheels 41—41 would be shifted into their retracted positions after the jack mechanism had been shifted into a position from which the load-carrying beam 16 may be placed in approximately centered relation with respect to the strut and spindle of the landing gear.

The general arrangement of the jack mechanism is such that when the transportation wheels are in their lowered position for movement of the mechanism on such wheels, the caster wheels 48—48 are relatively free of the ground. When the transportation wheels are retracted, the caster wheels 48—48 serve merely to support the weight of the jack mechanism and not the load of the aircraft raised by the jack mechanism. Inasmuch as these caster wheels are freely revoluble about their vertical axes, it will be apparent that when the jack beam 16 is approximately centered beneath the landing gear jack pad 14 and the adapter member 15 is raised into engagement with said pad to effect coaxial alinement of the interengaged jack pad and adapter member, the jack mechanism is automatically located in proper load-supporting position.

In actual operation, the preferred practice would be to position the beam 16 between the dual wheels 13—13 of the landing gear to be serviced, this being accomplished preferably by shifting the beam longitudinally into position upon a suitable roller or the like, one of which is shown in each of Figures 2 and 7, wherein it is designated by the reference numeral 59. Having so located the beam 16 proximately in position centrally beneath the lifting pad 14 of the landing gear, the jack mechanism consisting of the wheeled jack units 17—17 interconnected by the ramp 39 is moved into such position relatively to the beam 16 as to permit the opposite ends of the latter to be seated in the pockets 31—31 of the saddles 30 carried by the vertically movable outer channel members 25 of the jack units. Thereupon, upon actuating the jack units the beam 16 will be horizontally raised as said channel members 25—25 are moved under the influence of the jack pistons 20 to lift the landing gear to the height necessary for proper servicing thereof.

As most clearly appears in Figures 5 and 6, each of the hydraulic jack units 17 is provided with a ground engaging plate 49, each such plate being fixedly secured to the bottom of the jack cylinder base 18. Secured to the fore and aft ends of each of these base plates 49 are vertically extending pins 50—50 which project upwardly through the base of the rail 44 secured to and interconnecting the fore and aft caster wheels 48—48, these pins being provided at their upper ends with spring abutment collars or nuts 51—51. Coiled compression springs 52—52 are interposed between the base of the rail 44 and the abutments 51—51 to impart an upward spring bias to the plate 49 tending to maintain the latter and the jack unit 17 supported thereby slightly above the surface of the ground engaged by the caster wheels 48—48. Suitable bumper blocks 53—53 are interposed between the rail 44 and the plate 49 of each jack mechanism to limit upward movement of the latter under the influence of the springs 52—52.

Upon imposition of the load of the aircraft landing gear upon the horizontal jack beam 16 extending between the pair of jack units respectively disposed to either side of the landing gear wheel spindle 12, the base plates 49—49 of the jack units will be pressed downwardly into firm engagement with the ground, as shown in Figure 6, the lifting force of the coiled compression springs 52—52 being, of course, overcome immediately upon subjecting the lifting jacks to the load to be lifted.

In order to lock the transportation wheels 41—41 in their operative position as shown in Figure 7 or in their retracted position as shown in Figure 8, the free end of the shifting arm 45 is fitted with an operating handle 54 having a spring pressed detent 55 engageable within a detent hold 56ª suitably formed in the outer wall 43 of the caster wheel rail member 44. A preferred construction of this spring pressed detent is shown in detail in Figure 15 wherein it will be observed that the detent element 55 is adapted to be retracted against the restraining influence of a coiled compression spring 56 by pulling ouwardly upon a collar 57 slidably fitted upon the outer end of the operating handle 54. Of course, any other suitable means may be provided for releasably securing the shifting arm 45 in one or the other of its operative positions.

Each of the lifting jack units 17—17 is conventionally provided with a fluid pressure pump operating lever 58. These levers may be operated independently or conjointly, as will presently appear, to supply the lifting jacks with the pressure fluid necessary for raising their pistons 20 to lift the beam 16 against the load of the landing gear to be raised.

In order to insure that the pistons 20—20 of the jack units move in unison and so prevent any possibility of one end of the jack beam 16 rising higher than the other, it is preferred that the jack units be hydraulically interconnected, as shown in Figures 9 to 12, each unit being suitably provided with a metering valve element 60 such as is shown in Figures 13 and 14, this metering element 60 being inserted in the base 18 of each jack unit to restrict the flow of the pressure fluid from the pump of a given unit to the pressure cylinder 21 thereof.

Although the metering valve element 60 of the present invention is adapted for use in conjunction with various types of commercially available hydraulic jack units, in the present instance it has been shown as employed in connection with that conventional type of jack unit wherein the pressure fluid, such as oil, is contained in the reservoir 23 formed between the concentral walls of the pair of inner and outer cylinders 21 and 19, the inner cylinder 21 being that in which the load-lifting piston 20 is operated by the pressure of the oil pumped from the reservoir 23 into the bottom of the pressure cylinder 21. Preferably, the reservoirs 23—23 of the pair of hydraulic jack units 17—17 are commonly connected by a conduit 61, while the internal pressure cylinders are also commonly connected by a conduit 62 at any desired point in which is included a cut-off valve 63. This valve 63 in the high pressure line 62 is normally open for dual operation of the fluid pressure jack units 17—17, said valve being closed only when independent operation of these units is desired.

Each of the jack units 17—17 includes a pump piston 64 operated by the pivoted jack lever 58 hereinbefore mentioned, this pump piston being vertically reciprocable in its own cylinder 65 to draw oil from the oil reservoir 23 into the bottom of the cylinder 65 upon each upward stroke of the piston 64 and then force it into the pressure cylinder 21 upon each down stroke of the piston 64. The flow of the oil from the supply reservoir 23 to the pump cylinder 65 and its delivery therefrom to the pressure cylinder 21 is as shown in Figure 12, the oil from the reservoir 23 entering the port 66 and being drawn into the bottom of the pump cylinder 65 by way of a suitable check valve 67, the oil being then forced out of the pump cylinder to the pressure cylinder 21 by way of a check valve port 68 in communication with a passage 69 leading to the high pressure cylinder 21. The outer ends of these passages 69 are interconnected by the high pressure conduit 62 aforesaid, in consequence of which when the valve 63 is open the high pressure cylinders 21 of both jack units 17—17 are in communication with each other and with both pump cylinders of the jack units.

Each passage 69 of a given jack unit is in communication with its oil reservoir 23 by way of a port 70 and duct 71, the port 70 of each jack unit being closed for pressure lift operation of each jack. To this end each of the ports 70 is fitted with an externally operable closure valve 72, which, when opened, directly connects the high pressure cylinder 21 with the reservoir 23 for return of the oil from the former to the latter, as when it is desired to lower the load-raising piston 20 of the jack unit.

Fitted in each of the passages 69—69 is one of the metering valve elements 60 hereinbefore referred to, each of these elements being in the form of a tube having a bore 73 extending longitudinally therethrough and the opposite ends thereof being slotted, as at 74 and 75. The tubular valve metering element 60 is provided with an intermediate body portion 76 of enlarged diameter adapted to closely fit within the bore of the passage 69, this enlarged body portion 76 being disposed between the valve 72 and the port leading into the high pressure cylinder 21. The enlarged body portion 76 thus serves to restrict the free flow of oil from the pump cylinder 65 to the high pressure cylinder 21 when the jacks are operated under load-lifting pressure and to correspondingly restrict the free flow of oil from the high pressure cylinder back to the reservoir when the valves 72 are open to effect lowering of the jacks. The enlarged body portions 76 so fitted in the passages 69 restrict the oil flow therethrough by causing it to pass through the relatively small diameter bore of the tubular elements 60, the oil being constrained under pressure lift operation of either of the jack units 17—17 to flow through the bore 73 into the high pressure cylinder 21 of one jack directly by way of the slotted end 75 of the member 60 and into the high pressure cylinder 21 of the other jack by way of the conduit 62 and the tube 60 fitted in said other jack.

Operation of the metering valve 60 is essentially dependent upon a pressure differential existing between the inner end of the valve tube 60 and the pump during pump discharge, which causes the pressure fluid to be distributed equally between the high pressure cylinders 21 of both jack units. To this end, the internal bore 73 of the metering valve tube 60 is of such reduced diameter as to reduce the normal rate of flow of the fluid through the passage 69 leading from the pump to the high pressure cylinder, thereby building up the pressure differential above referred to. The same action occurs during lowering of the jack units, the tubular elements then serving to reduce the normal rate of flow of the fluid from the high pressure cylinder to the reservoir by way of the opened valve 72.

The metering tubes 60—60 thus operate in each instance to equalize the flow of oil under pressure to the high pressure cylinders of both jacks, each of said high pressure cylinders thus receiving substantially equal increments of fluid under pressure to insure uniform pressure lift operation thereof when the valves 72 are both closed. When either of these latter valves are open, the metering tubes 60 serve to equalize the flow of oil outwardly of the two high pressure cylinders, this equalization in flow of the oil into and out of both of the high pressure cylinders of the jacks being effected automatically should either one of the jack levers 58 be operated alone or should both of them be operated simultaneously. By closing the valve 63 in the high pressure line 62 each jack may be operated independently of the other in conventional manner, there being then no equalized flow of oil into and out of the high pressure cylinders of the jacks.

It will be understood, of course, that the present invention is susceptible of various changes and modifications which may be made from time to time without departing from the general principles or real spirit thereof, and it is accordingly intended to claim the same broadly as well as specifically as indicated in the appended claims.

What is claimed as new and useful is:

1. A lifting jack mechanism of the character described comprising, in combination, a horizontal load-supporting beam adapted to be freely disposed beneath the jack pad of an aircraft landing gear, said beam being centrally fitted with an adapter engageable with said jack pad, a pair of laterally spaced hydraulically operable lifting jack units respectively engaging the opposite ends of the beam to support the same for raising and lowering thereof under load, said jack units being positionally movable to vary the lateral spacing therebetween, means interconnecting said jack units for maintaining the same in adjusted laterally spaced relation, and means for effecting positional adjustment of the mechanism to insure axial vertical alinement of said beam adapter with said landing gear jack pad.

2. A lifting jack mechanism of the character described comprising, in combination, a horizontal load-supporting beam adapted to be freely disposed beneath the jack pad of an aircraft landing gear, said beam being centrally fitted with an adapter engageable with said jack pad, a pair of laterally spaced hydraulically operable lifting jack units respectively engaging the opposite ends of the beam to support the same for raising and lowering thereof under load, said jack units being positionally movable to vary the lateral spacing therebetween, means interconnecting said jack units for maintaining the same in adjusted laterally spaced relation, and means for effecting positional adjustment of the mechanism to insure axial vertical alinement of said beam adapter with said landing gear jack pad, said last-mentioned means including a wheeled support for each jack unit.

3. A lifting jack mechanism of the character described comprising, in combination, a horizontal load-supporting beam adapted to be freely disposed beneath the jack pad of an aircraft landing gear, said beam being centrally fitted with an adapter engageable with said jack pad, a pair of laterally spaced hydraulically operable lifting jack units respectively engaging the opposite ends of the beam to support the same for raising and lowering thereof under load, said jack units being positionally movable to vary the lateral spacing therebetween, means interconnecting said jack units for maintaining the same in adjusted laterally spaced relation, means for effecting positional adjustment of the mechanism to insure axial vertical alinement of said beam adapter with said landing gear jack pad, said last-mentioned means including a wheeled support for each jack unit, and a spring-biased base plate mounted upon said wheeled support for supporting each jack unit above ground when said unit is not under load.

4. A lifting jack mechanism of the character described, in combination, a load-supporting beam adapted for horizontal disposition beneath a load to be raised or lowered, a pair of hydraulically operated lifting jack units having means respectively adapted to engage opposite ends of the load-supporting beam, said jack units being positionally adjustable into predeterminedly fixed laterally spaced relation, means interconnecting said jack units to secure the same in said fixed laterally spaced relation, transportation wheels for said mechanism, and means for retracting said wheels into non-transporting position.

5. A lifting jack mechanism of the character described, in combination, a load-supporting beam adapted for horizontal disposition beneath a load to be raised or lowered, a pair of hydraulically operated lifting jack units having means respectively adapted to engage opposite ends of the load-supporting beam, said jack units being positionally adjustable into predeterminedly fixed laterally spaced relation, means interconnecting said jack units to secure the same in said fixed laterally spaced relation, transportation wheels for said mechanism, and means for retracting said wheels into non-transporting postion, said last-mentioned means including eccentric mountings for said transportation wheels and shifting arms for shifting said wheels from operative to inoperative position.

6. A lifting jack mechanism of the character described comprising, in combination, an hydraulically operated jack unit including a vertically disposed fluid pressure cylinder having a vertically movable piston, a channel member relatively fixed with respect to and embracing said cylinder, a second channel member telescopically associated with said fixed channel member for vertical movement relatively thereto, the corresponding side walls of said channel members being interengaged to prevent lateral displacement of the latter during relative vertical movement thereof, and means carried by said second channel for engagement by the piston of the jack unit to effect vertical movement of said second channel member.

7. A lifting jack mechanism of the character described comprising, in combination, an hydraulically operated jack unit including a vertically disposed fluid pressure cylinder having a vertically movable piston, a channel member relatively fixed with respect to and embracing said cylinder, a second channel member telescopically associated with said fixed channel member for vertical movement relatively thereto, the corresponding side walls of said channel members being interengaged to prevent lateral displacement of the latter during relative vertical movement thereof, and means carried by said second channel for engagement by the piston of the jack unit to effect vertical movement of said second channel member, said vertically movable channel member being provided with a saddle for supporting the end of a horizontally disposed load-supporting beam.

8. A lifting jack for airplanes having dual landing wheels supported upon a common shaft, in combination, a supporting beam adapted to be freely disposed upon the ground between said landing wheels and beneath said wheel shaft, a depending jack pad on said wheel shaft, means on said beam engageable with said jack pad when said beam is raised into airplane lifting position, a lifting jack unit including a pair of laterally spaced fluid-pressure-actuated lifting members respectively engageable with opposite ends of said beam to raise the same horizontally into airplane lifting position, and means whereby said jack unit can be shifted bodily from the outer side toward the inner side of one of the dual wheels in the direction of the wheel axis to center said lifting members between said dual wheels and in position to respectively engage opposite ends of said beam.

9. A lifting jack for airplanes having dual landing wheels supported upon a common shaft, in combination, a supporting beam adapted to be freely disposed upon the ground between said landing wheels and beneath said wheel shaft, a depending jack pad on said wheel shaft, means on said beam engageable with said jack pad when said beam is raised into airplane lifting position, a lifting jack unit including a pair of laterally spaced fluid-pressure-actuated lifting members respectively engageable with opposite ends of said beam to raise the same horizontally into airplane lifting position, means whereby said jack unit can be shifted bodily from the outer side toward the inner side of one of the dual wheels in the direction of the wheel axis to center said lifting members between said dual wheels and in position to respectively engage opposite ends of said beam, and means for actuating in unison said laterally spaced lifting members of the jack unit.

10. A lifting jack for airplanes having dual landing wheels supported upon a common shaft, in combination, a supporting beam adapted to be freely disposed upon the ground between said landing wheels and beneath said wheel shaft, a depending jack pad on said wheel shaft, means on said beam engageable with said jack pad when said beam is raised into airplane lifting position, a lifting jack unit including a pair of laterally spaced fluid-pressure-actuated lifting members respectively engageable with opposite ends of said beam to raise the same horizontally into airplane lifting position, means whereby said jack unit can be shifted bodily from the outer side toward the inner side of one of the dual wheels in the direction of the wheel axis to center said lifting members between said dual wheels and in position to respectively engage opposite ends of said beam, and means for centering said beam relatively to said jack pad preliminarily to engaging said beam with said jack pad.

11. A lifting jack for airplanes having dual landing wheels supported upon a common shaft, in combination, a supporting beam adapted to be freely disposed upon the ground between said landing wheels and beneath said wheel shaft, a depending jack pad on said wheel shaft, means on said beam engageable with said jack pad when said beam is raised into airplane lifting position, a lifting jack unit including a pair of laterally spaced fluid-pressure-actuated lifting members respectively engageable with opposite ends of said beam to raise the same horizontally into airplane lifting position, means whereby said jack unit can be shifted bodily from the outer side toward the inner side of one of the dual wheels in the direction of the wheel axis to center said lifting members between said dual wheels and in position to respectively engage opposite ends of said beam, and means for insuring rectilinear vertical movement of said lifting members during the operation of raising the airplane by the beam horizontally supported between said lifting members.

JOHN J. WRENN.

REFERENCES CITED

The following references are of record in the file of this patent:

UNITED STATES PATENTS

| Number | Name | Date |
|---|---|---|
| 1,400,931 | Barker | Dec. 20, 1921 |
| 1,477,790 | Townsend | Dec. 18, 1923 |
| 1,999,834 | Ernst | Apr. 30, 1935 |
| 2,010,679 | Rosenberry et al. | Aug. 6, 1935 |
| 2,103,530 | Henry | Dec. 28, 1937 |
| 2,125,186 | Krum | July 26, 1938 |
| 2,147,187 | Bailey | Feb. 14, 1939 |
| 2,163,959 | Nilson | June 27, 1939 |
| 2,301,122 | Kellett | Nov. 3, 1942 |
| 2,452,481 | Morehead et al. | Oct. 26, 1948 |